(12) United States Patent
Zguris et al.

(10) Patent No.: US 12,179,422 B2
(45) Date of Patent: Dec. 31, 2024

(54) ADDITIVE MANUFACTURING DEVICES INCLUDING A MULTI-COMPONENT PRINT SURFACE AND RELATED METHODS

(71) Applicant: Formlabs, Inc., Somerville, MA (US)

(72) Inventors: Zachary Zguris, Canterbury, NH (US); Maxim Lobovsky, Cambridge, MA (US); Dmitri Megretski, Carlisle, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 17/672,145

(22) Filed: Feb. 15, 2022

(65) Prior Publication Data

US 2022/0258414 A1    Aug. 18, 2022

Related U.S. Application Data

(60) Provisional application No. 63/150,295, filed on Feb. 17, 2021.

(51) Int. Cl.
| | |
|---|---|
| *B29C 64/124* | (2017.01) |
| *B29C 64/165* | (2017.01) |
| *B29C 64/255* | (2017.01) |
| *B33Y 10/00* | (2015.01) |
| *B33Y 30/00* | (2015.01) |
| *B33Y 70/00* | (2020.01) |
| *B29K 105/00* | (2006.01) |

(52) U.S. Cl.
CPC .......... *B29C 64/165* (2017.08); *B29C 64/255* (2017.08); *B33Y 10/00* (2014.12); *B33Y 30/00* (2014.12); *B33Y 70/00* (2014.12); *B29K 2105/251* (2013.01); *B29K 2995/0026* (2013.01)

(58) Field of Classification Search
CPC ... B29C 64/165; B29C 64/255; B29C 64/124; B33Y 10/00; B33Y 30/00; B33Y 70/00; B29K 2105/251; B29K 2995/0026
See application file for complete search history.

(56) References Cited

U.S. PATENT DOCUMENTS

| | | | |
|---|---|---|---|
| 2011/0283778 A1* | 11/2011 | Angelescu | B01D 69/02 427/430.1 |
| 2016/0288376 A1* | 10/2016 | Sun | A61C 13/0019 |
| 2017/0129175 A1* | 5/2017 | Zitelli | B29C 37/0067 |
| 2017/0283316 A1* | 10/2017 | Meuler | B05D 5/08 |
| 2018/0250874 A1* | 9/2018 | Tringaly | G02F 1/133617 |
| 2018/0297281 A1* | 10/2018 | Baltaji | B33Y 30/00 |
| 2019/0160733 A1 | 5/2019 | Mirkin et al. | |
| 2020/0171740 A1* | 6/2020 | Boydston | C08G 59/24 |
| 2020/0324466 A1* | 10/2020 | Nishida | B33Y 10/00 |
| 2021/0114288 A1* | 4/2021 | Mirkin | B29C 67/24 |

FOREIGN PATENT DOCUMENTS

WO    WO 2020-0247743 A2    12/2020

\* cited by examiner

*Primary Examiner* — Galen H Hauth
*Assistant Examiner* — Baileigh Kate Darnell
(74) *Attorney, Agent, or Firm* — Michael J. Attisha; Greenberg Traurig, LLP

(57) ABSTRACT

A multi-component print surface and associated additive manufacturing methods are generally described.

15 Claims, 6 Drawing Sheets

ADDITIVE MANUFACTURING DEVICES INCLUDING A MULTI-COMPONENT PRINT SURFACE AND RELATED METHODS

RELATED APPLICATIONS

The present application claims the benefit under 35 U.S.C. § 119(e) of U.S. Provisional Application No. 63/150,295, filed Feb. 17, 2021, and entitled "ADDITIVE MANUFACTURING DEVICES INCLUDING A MULTI-COMPONENT PRINT SURFACE AND RELATED METHODS," which is incorporated herein by reference in its entirety for all purposes.

TECHNICAL FIELD

A multi-component print surface and associated additive manufacturing methods are generally described.

BACKGROUND

Additive manufacturing techniques, such as three-dimensional printing, may be used to fabricate a three-dimensional object, typically by causing portions of a resin building material to solidify at specific locations and forming subsequent layers on top of the solidified locations. The three-dimensional object may be formed on a build platform such that layers of the three-dimensional object are formed in contact with a print surface in addition to the build platform or a previously cured layer thereupon. In some cases, the three-dimensional object adheres to the print surface, resulting in deformation of the three-dimensional object upon removal.

Accordingly, improved devices including a print surface and methods related to additive manufacturing are necessary.

SUMMARY

Additive manufacturing devices comprising a multi-component print surface, and related methods, are generally described. The subject matter of the present invention involves, in some cases, interrelated products, alternative solutions to a particular problem, and/or a plurality of different uses of one or more systems and/or articles.

According to some embodiments, an additive manufacturing device is described, the additive manufacturing device comprising a print surface configured to contact a three-dimensional object formed by additive manufacturing. In certain embodiments, the print surface comprises a first component comprising a solid matrix and a second component comprising a fluid, wherein the second component is at least partially disposed within the first component.

According to certain embodiments, a method of additive manufacturing is described, the method comprising forming a three-dimensional object from a resin by additive manufacturing such that the three-dimensional object is in contact with a print surface. In some embodiments, the print surface comprises a first component comprising a solid matrix and a second component comprising a fluid, wherein the second component is at least partially disposed within the first component.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

A multi-component print surface and associated additive manufacturing methods are generally described. The print surface may be incorporated into an additive manufacturing device and may be configured to contact an object (e.g., a three-dimensional object) formed by additive manufacturing (e.g., stereolithography). The print surface may comprise a first component comprising a solid matrix and a second component comprising a fluid (e.g., liquid). The first component and the second component may be configured such that the second component is at least partially disposed within the first component. Configuring the first component and the second component in this way advantageously provides a print surface requiring a relatively low peel force to remove a three-dimensional object in contact with the print surface.

The additive manufacturing devices described herein therefore provide significant advantages over conventional additive manufacturing devices in which a large peel force may be necessary to remove a fabricated three-dimensional object in contact with the print surface. Conventional additive manufacturing devices, for example, may contain a solid growth substrate that requires high peel forces to remove a three-dimensional object in contact with the solid growth substrate. In some cases, conventional additive manufacturing devices may require oxygen inhibition and/or an uncured layer of resin at the interface of the solid growth substrate and the resin being cured in order to peel a three-dimensional object in contact with the solid growth substrate.

The print surface described herein may have a relatively long lifetime. In some embodiments, for example, the fluid (e.g., liquid) of the second component may be replenished overtime using a reservoir of the fluid. As described in further detail herein, the print surface may be configured proximate to the reservoir, such that the fluid may be released by the reservoir and delivered to the print surface as needed or desired. In some embodiments, for example, the fluid (e.g., liquid) of the second component may evaporate overtime during use of the print surface, thereby necessitating that the fluid in the reservoir be released and delivered to the print surface to replenish the lost amount of fluid.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
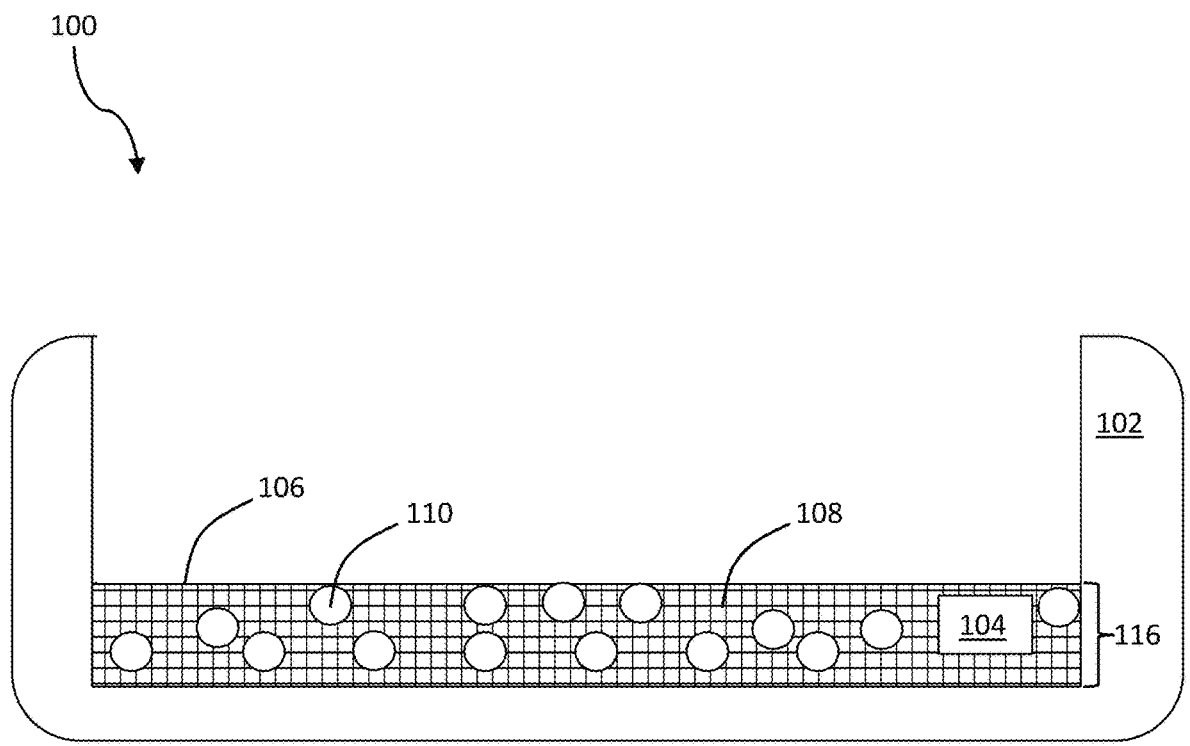
FIG. 1 shows, according to some embodiments, a cross-sectional diagram of an additive manufacturing device comprising a print surface.

FIG. 1 shows, according to some embodiments, a cross-sectional diagram of an additive manufacturing device comprising a print surface. Additive manufacturing device 100 may be a stereolithographic three-dimensional printer, according to certain embodiments. As shown in FIG. 1, additive manufacturing device 100 may comprise tank 102 and print surface 104 disposed within tank 102. According to some embodiments, print surface 104 is configured to contact a three-dimensional object formed by additive manufacturing. As explained in further detail herein, print surface 104 may comprise interface 106, which may be an interface between print surface 104 and a resin and/or a three-dimensional object fabricated from the resin.

In certain embodiments, at least a portion of print surface 104 and at least a portion of tank 102 may be transparent. An at least partially transparent print surface 104 and tank 102 may advantageously allow for radiation (e.g., actinic radiation) to pass through print surface 104 and tank 102 in order to cure a resin (e.g., a photopolymer resin) disposed on print surface 104, thereby providing a three-dimensional object in contact with print surface 104, as explained in further detail herein.

Referring to FIG. 1, print surface 104 may have thickness 116. Print surface 104 may have any of a variety of suitable thicknesses. In some embodiments, the thickness of print surface 104 is greater than or equal to 1 micrometer, greater than or equal to 100 micrometers, greater than or equal to 1 mm, greater than or equal to 1 cm, or greater. In certain embodiments, the thickness of print surface 104 is less than or equal to 10 centimeters, less than or equal to 1 cm, less than or equal to 1 mm, less than or equal to 100 micrometers, or less. Combinations of the above recited ranges are also possible (e.g., the print surface has a thickness greater than or equal to 1 micrometer and less than or equal to 10 centimeters). Other ranges are also possible.

As explained in further detail herein, print surface 104 may be disposed over a support layer. In certain embodiments, it may be advantageous to use print surface 104 in combination with the support layer in instances where print surface 104 is relatively thin (e.g., between greater than or equal to 1 micrometer and less than or equal to 1 mm).

According to certain embodiments, print surface 104 comprises first component 108. In some embodiments, first component 108 comprises a solid matrix. The solid matrix advantageously provides print surface 104 with an appreciable structure and geometric stability, in some embodiments. The solid matrix may, in certain embodiments, comprise a solid material (e.g., a crystalline solid, a semi-crystalline solid) or semi-solid material (e.g., a non-crystalline solid, an amorphous solid). In some embodiments, the solid matrix comprises a polymer or a glass. For example, in certain embodiments, the solid matrix comprises a gel (e.g., a hydrogel), an aerogel, fibers, a foam, an elastomer (e.g., a fluorocarbon elastomer, such as FKM or FPM), a silicate, a sintered powder, and/or combinations thereof.

According to some non-limiting embodiments, the solid matrix comprises polydimethylsiloxane (PDMS), polytetrafluoroethylene (PTFE), polymethylpentene (PMP), fluorinated ethylene propylene (FEP), ethylene tetrafluoroethylene (ETFE), a perfluoroalkoxy alkane (PFA), a fluorosilicone (e.g., fluorovinylmethylsiloxane (FVMQ)), silicon dioxide, and/or combinations thereof.

In certain embodiments, the solid matrix (e.g., fiber) may be woven or non-woven. In some embodiments, the solid matrix (e.g., foam) may be open cell and/or closed cell.

According to some embodiments, the solid matrix may have a high Young's modulus (e.g., less than or equal to 1000 GPa) or a low Young's modulus (e.g., greater than or equal to 0.002 GPa). Other moduli are also possible.

In some embodiments, the solid matrix may be at least partially porous. In certain embodiments, for example, the solid matrix comprises a plurality of pores. As would be understood by a person of ordinary skill in the art, the term pore generally refers to an opening in a surface. According to some non-limiting embodiments, for example, a solid matrix comprising a foam may be at least partially porous.

According to some embodiments, at least a portion of the plurality of pores may be randomly distributed throughout the solid matrix. In certain embodiments, at least a portion of the plurality of pores are patterned.

The plurality of pores may have any of a variety of suitable shapes and/or sizes. In some embodiments, for example, one or more of the plurality of pores may be circular, triangular, rectangular, etc. The plurality of pores may, in certain embodiments, have an average characteristic dimension (e.g., a width, length, diameter, depth) on the millimeter, micrometer, and/or nanometer scale. In some embodiments, for example, the plurality of pores have an average characteristic dimension (e.g., a width, length, diameter, depth) less than or equal to 1 millimeter, less than or equal to 1 micrometer, less than or equal to 100 nm, or less. In certain embodiments, the plurality of pores have an average characteristic dimension (e.g., a width, length, diameter, depth) greater than or equal to 1 nm, greater than or equal to 100 nm, greater than or equal to 1 micrometer, or greater. Combinations of the above recited ranges are also possible (e.g., the plurality of pores have an average characteristic dimension less than or equal to 1 millimeter and greater than or equal to 1 nm). Other ranges are also possible. The average characteristic dimension of the plurality of pores may be determined using techniques known to a person of ordinary skill in the art, such as, for example, scanning electron microscopy (SEM) and/or transmission electron microscopy (TEM).

According to some embodiments, the solid matrix may comprise a plurality of voids. As would be understood by a person of ordinary skill in the art, the term void generally refers to a vacant space between constituent particles in a solid-state structure. According to certain non-limiting embodiments, for example, a solid matrix comprising a gel may comprise a plurality of voids.

The plurality of voids may have any of a variety of suitable shapes and/or sizes, including the shapes and/or sizes described herein in reference to the plurality of pores.

The solid matrix may have any of a variety of suitable void fractions. As would generally be understood by a person of ordinary skill in the art, a void fraction refers to the fraction of the volume of voids over the total volume of the solid matrix. In some embodiments, for example, the solid matrix has a void fraction greater than or equal to 10%, greater than or equal to 30%, greater than or equal to 50%, greater than or equal to 70%, or greater. In certain embodiments, the solid matrix has a void fraction less than or equal to 90%, less than or equal to 70%, less than or equal to 50%, less than or equal to 10%, or less. Combinations of the above recited ranges are also possible (e.g., the solid matrix has a void fraction greater than or equal to 10% and less than or equal to 90%). Other ranges are also possible. The void fraction of the solid matrix may be determined using techniques known to a person of ordinary skill in the art, such as, for example, computed tomography (CT).

Print surface 104 may comprise first component 108 in any of a variety of suitable amounts. In some embodiments, for example, the print surface comprises first component 108 in an amount greater than or equal to 1 weight percent (wt. %), greater than or equal to 10 wt. %, greater than or equal to 30 wt. %, greater than or equal to 50 wt. %, greater than or equal to 70 wt. %, or greater, based on the total weight of print surface 104. In certain embodiments, print surface 104 comprises first component 108 in an amount less than or equal to 90 wt. %, less than or equal to 70 wt. %, less than or equal to 50 wt. %, less than or equal to 30 wt. %, less than or equal to 10 wt. %, or less, based on the total weight of print surface 104. Combinations of the above recited ranges are also possible (e.g., print surface 104 comprises first component 108 in an amount between greater than or equal to 10 wt. % and less than or equal to 90 wt. % based on the total weight of print surface 104). Other ranges are also possible.

According to some embodiments, print surface 104 comprises second component 110. In certain embodiments, second component 110 comprises a fluid. In some embodiments, the fluid is a liquid. For example, in some embodiments, the liquid comprises a fluorinated liquid, a silicone oil, and/or an ionic liquid.

In certain non-limiting embodiments, the liquid comprises hexafluoropropylene oxide, (per)fluorinated alkyl amines, and/or polymers thereof. The liquid comprises PDMS, according to certain non-limiting embodiments. In some non-limiting embodiments, the liquid comprises a molten salt.

The liquid may have a low viscosity (e.g., greater than or equal to 0.1 mPa·s) or a high viscosity (e.g., less than or equal to 100 mPa·s), in certain embodiments. Other viscosities are also possible.

In some embodiments, the liquid may have a low vapor pressure (e.g., greater than or equal to 0.1 kPa) or a high vapor pressure (e.g., less than or equal to 200 kPa). Other vapor pressures are also possible.

Print surface 104 may comprise second component 110 in any of a variety of suitable amounts. In some embodiments, for example, print surface 104 comprises second component 110 in an amount greater than or equal to 10 weight percent (wt. %), greater than or equal to 30 wt. %, greater than or equal to 50 wt. %, greater than or equal to 70 wt. %, greater than or equal to 90 wt. %, or more, based on the total weight of print surface 104. In certain embodiments, print surface 104 comprises second component 110 in an amount less than or equal to 99 wt. %, less than or equal to 90 wt. %, less than or equal to 70 wt. %, less than or equal to 50 wt. %, less than or equal to 30 wt. %, or less, based on the total weight of print surface 104. Combinations of the above recited ranges are also possible (e.g., print surface 104 comprises second component 110 in an amount between greater than or equal to 10 wt. % and less than or equal to 99 wt. % based on the total weight of print surface 104). Other ranges are also possible.

According to certain embodiments, second component 110 is at least partially disposed within first component 108. Referring, for example, to FIG. 1, print surface 104 may comprise first component 108 and second component 110 disposed within first component 108. As described herein, the solid matrix of first component 108 may comprise a plurality of pores, in some embodiments, and second component 110 may be disposed within one or more pores of first component 108. According to some embodiments, first component 108 may comprise a plurality of voids and second component 110 may be disposed within one or more voids of first component 108. In some embodiments, for example, first component 108 may comprise a porous foam (e.g., an open cell foam, a closed cell foam), a porous expanded structure (e.g., expanded PTFE), a porous silicate, and/or a porous gel (an aerogel, a hydrogel), and second component 110 may be disposed within one or more pores and/or voids of first component 108.

According to some embodiments, second component 110 is at least partially absorbed by first component 108. For example, as described herein, the solid matrix of first component 108 may comprise a material capable of absorbing at least a portion of second component 110, such as (but not limited to) a woven or non-woven fiber. First component 108 may be capable of absorbing any of a variety of suitable amounts of second component 110. In some embodiments, for example, first component 108 is capable of absorbing second component 110 in an amount greater than or equal to 1% of the total weight of first component 108, greater than or equal to 20% of the total weight of first component 108, greater than or equal to 50% of the total weight of first component 108, or greater. In certain embodiments, first component 108 is capable of absorbing second component 110 in an amount less than or equal to 100% of the total weight of first component 108, less than or equal to 50% of the total weight of first component 108, less than or equal to 20% of the total weight of first component 108, or less. Combinations of the above recited ranges are also possible (e.g., first component 108 is capable of absorbing second component 110 in an amount between greater than or equal to 1% and less than or equal to 100% of the total weight of first component 108). Other ranges are also possible.

According to certain embodiments, in addition to being at least partially disposed within first component 108, second component 110 may be at least partially disposed over first component 108. For example, in some embodiments, second component 110 (e.g., the fluid) may at least partially form a film (e.g., a thin film) over first component 108. It may be advantageous, in certain embodiments, for second component 110 to be at least partially disposed over first component 108 as a film, as such a configuration results in a relatively low peel force required to remove a three-dimensional object in contact with the print surface, as is explained in further detail herein.

First component 108 and second component 110 may be miscible, in certain embodiments. In other embodiments, first component 108 and second component 110 are immiscible. In certain embodiments wherein first component 108 and second component 110 are immiscible, first component 108 and second component 110 may form an emulsion. For example, in some embodiments, the solid matrix may comprise a semi-solid (e.g., a gel) and the liquid may form an emulsion with the semi-solid.

According to certain embodiments, first component 108 may be or comprise a sintered powder, and second component 110 may be dispersed, mixed, and/or blended with the sintered powder. In some embodiments, the dispersion, mixture, and/or blend of the sintered power and second component 110 (e.g. fluid) may be cured (e.g., by the application of heat and/or irradiation) to form a film comprising the sintered power and second component 110 (e.g., fluid).

As described herein, the additive manufacturing device may further comprise a reservoir, in certain embodiments. The reservoir may, in some embodiments, be configured to contain second component 110 (e.g., the fluid). According to some embodiments, second component 110 in print surface 104 may evaporate overtime during use of the print surface 104. In such instances, the reservoir may replenish second component 110 by releasing and transporting second component 110 to print surface 104 as needed or desired. Configuring the additive manufacturing device in this way advantageously allows for long-term operation of the additive manufacturing device, for example, without replacing the print surface 104. In other embodiments, print surface 104 may be removed from tank 102 and replaced if print surface 104 does not include a sufficient amount of second component 110.

In some embodiments, the driving force for transporting fluid (e.g., liquid) from the reservoir to print surface 104 is a pressure difference. For example, in some embodiments, the reservoir may be associated with a relevant pressure source (e.g., a hydraulic pressure source such as a pump, piston, etc.), such that the reservoir may be under a positive pressure. According to certain embodiments, the driving force for transporting fluid (e.g., liquid) from the reservoir to print surface 104 is an interfacial surface tension and/or capillary action.

Figure 2A:
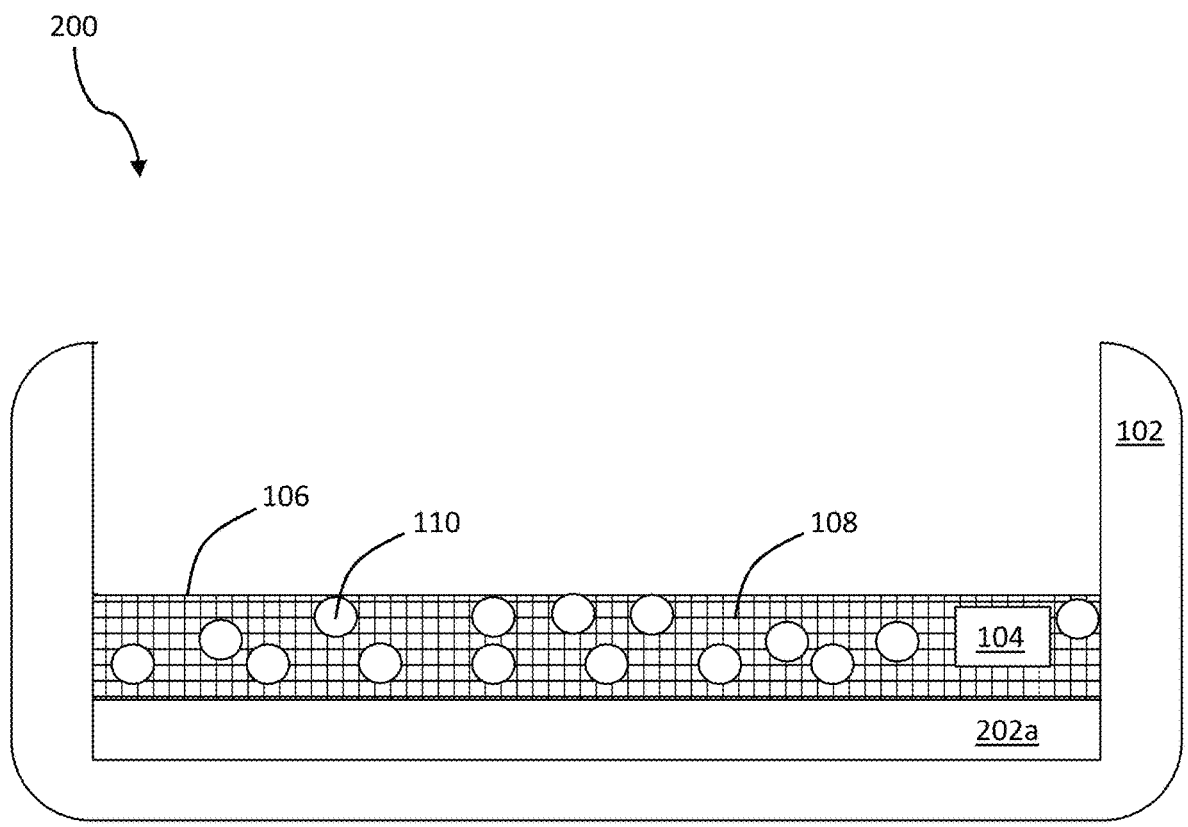
FIG. 2A shows, according to some embodiments, a cross-sectional diagram of an additive manufacturing device comprising a print surface disposed over a reservoir.

In some embodiments, print surface 104 is disposed over the reservoir. For example, FIG. 2A shows a cross-sectional diagram of additive manufacturing device 200 comprising print surface 104 disposed over reservoir 202a. In some such embodiments, fluid (e.g., liquid) contained in reservoir 202a may be released and transported into and/or through first component 108 of print surface 104. In some embodiments, reservoir 202a may be individually removed from tank 102 and replaced.

Figure 2B:
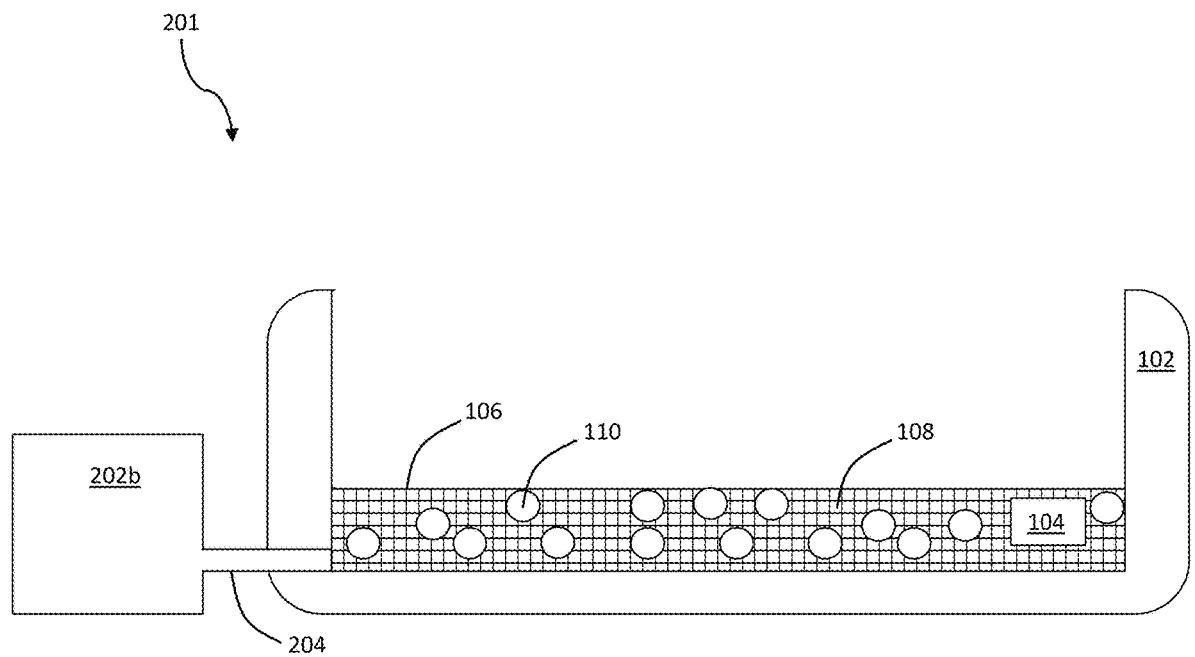
FIG. 2B shows, according to some embodiments, a cross-sectional diagram of an additive manufacturing device comprising a print surface disposed proximate to a reservoir.

In certain embodiments, print surface 104 is disposed proximate to the reservoir. FIG. 2B, for example, shows a cross-sectional diagram of additive manufacturing device 201 comprising print surface 104 disposed proximate to reservoir 202b. In some such embodiments, reservoir 202b may be connected to print surface 104 via reservoir inlet 204 (e.g., through wall of tank 102). Reservoir inlet 204 may, in some embodiments, transport fluid (e.g., liquid) contained in reservoir 202b into and/or through first component 108 of print surface 104. In certain embodiments, reservoir 202b may be replaced and/or replenished as needed.

Figure 3A:
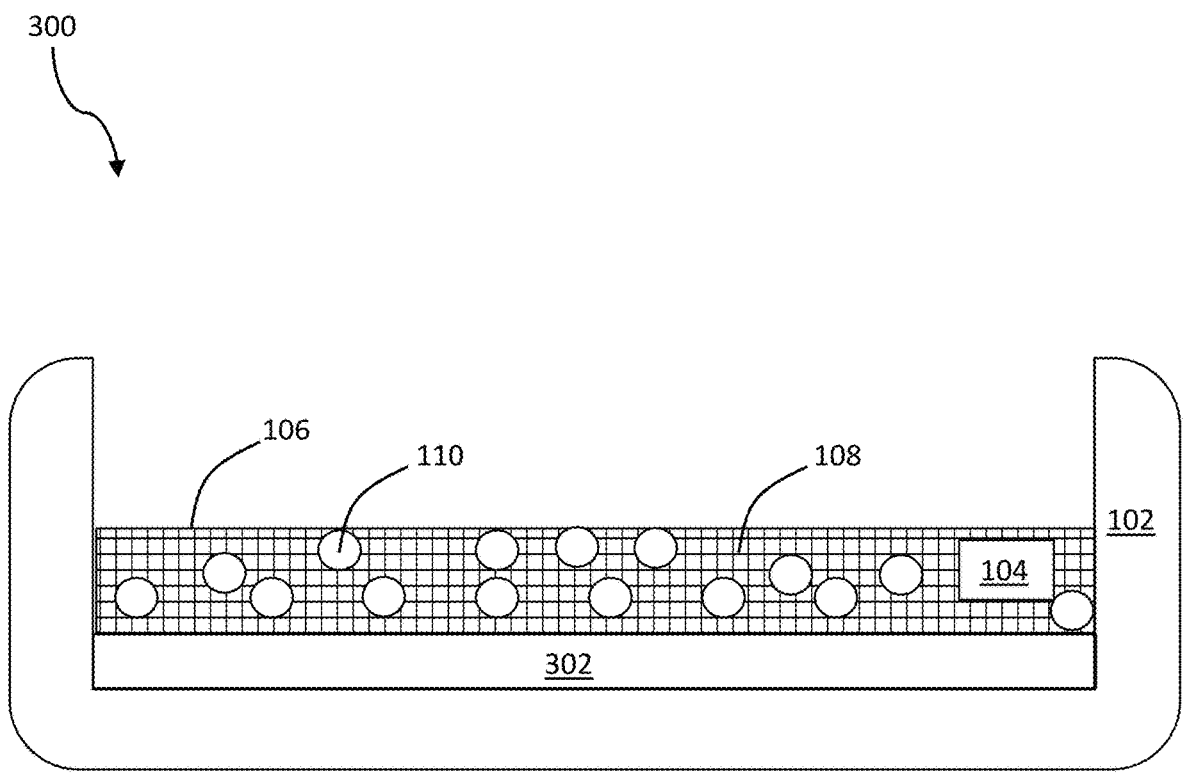
FIG. 3A shows, according to some embodiments, a cross-sectional diagram of an additive manufacturing device comprising a print surface disposed over a support layer.

According to some embodiments, print surface 104 is disposed over a support layer. FIG. 3A shows, according to some embodiments, a cross-sectional diagram of additive manufacturing device 300 comprising print surface 104 disposed over support layer 302. In some embodiments and as is shown in FIG. 3A, support layer 302 is disposed over tank 102. Alternatively, support layer 302 may be a part of tank 102, in some embodiments.

Support layer 302 may comprise any of a variety of suitable materials. In some embodiments, for example, support layer 302 comprises a silicate (e.g., glass) and/or an acrylate polymer.

Figure 3B:
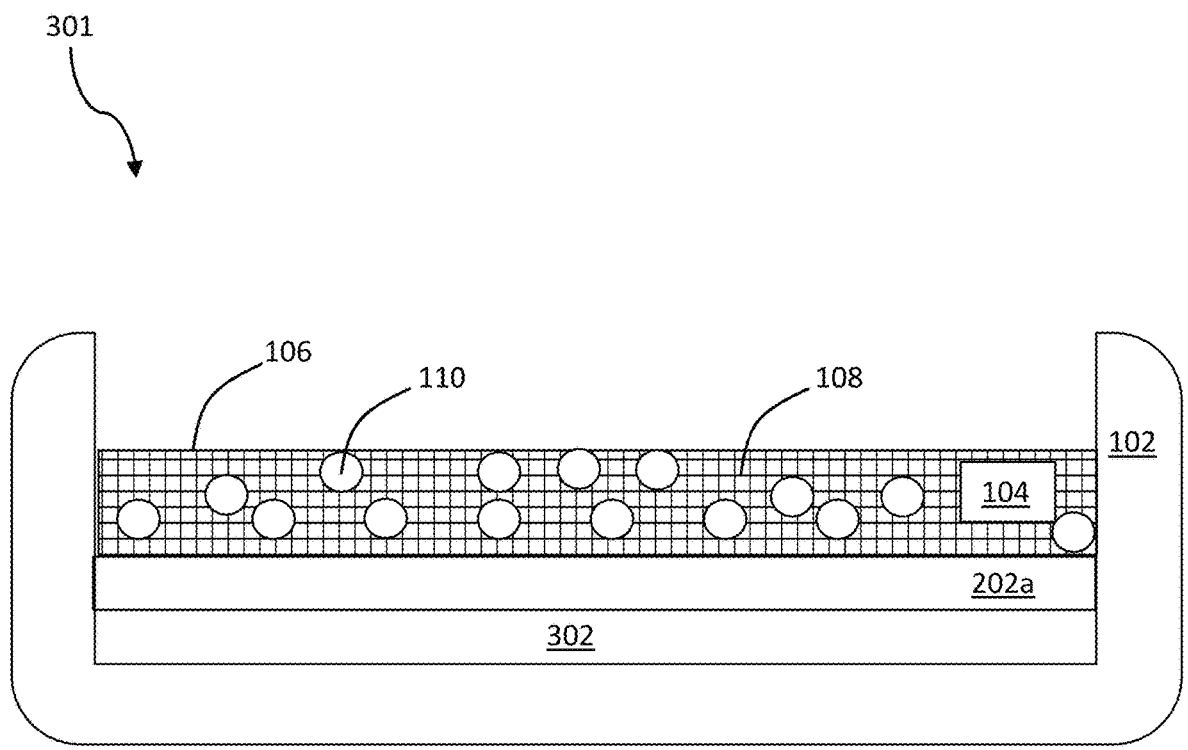
FIG. 3B shows, according to some embodiments, a cross-sectional diagram of an additive manufacturing device comprising a print surface disposed over a reservoir and a support layer.

In certain embodiments, the reservoir (e.g., of fluid) is disposed over the support layer. FIG. 3B shows, according to some embodiments, a cross-sectional diagram of additive manufacturing device 301 comprising print surface 104 disposed over reservoir 202a and support layer 302.

Support layer 302 may be at least partially transparent, in some embodiments. An at least partially transparent support layer 302 may advantageously allow radiation (e.g., actinic radiation) to pass through support layer 302 (and tank 102 and/or print surface 104) in order to cure a resin disposed on print surface 104, thereby providing a three-dimensional object.

Figure 4:
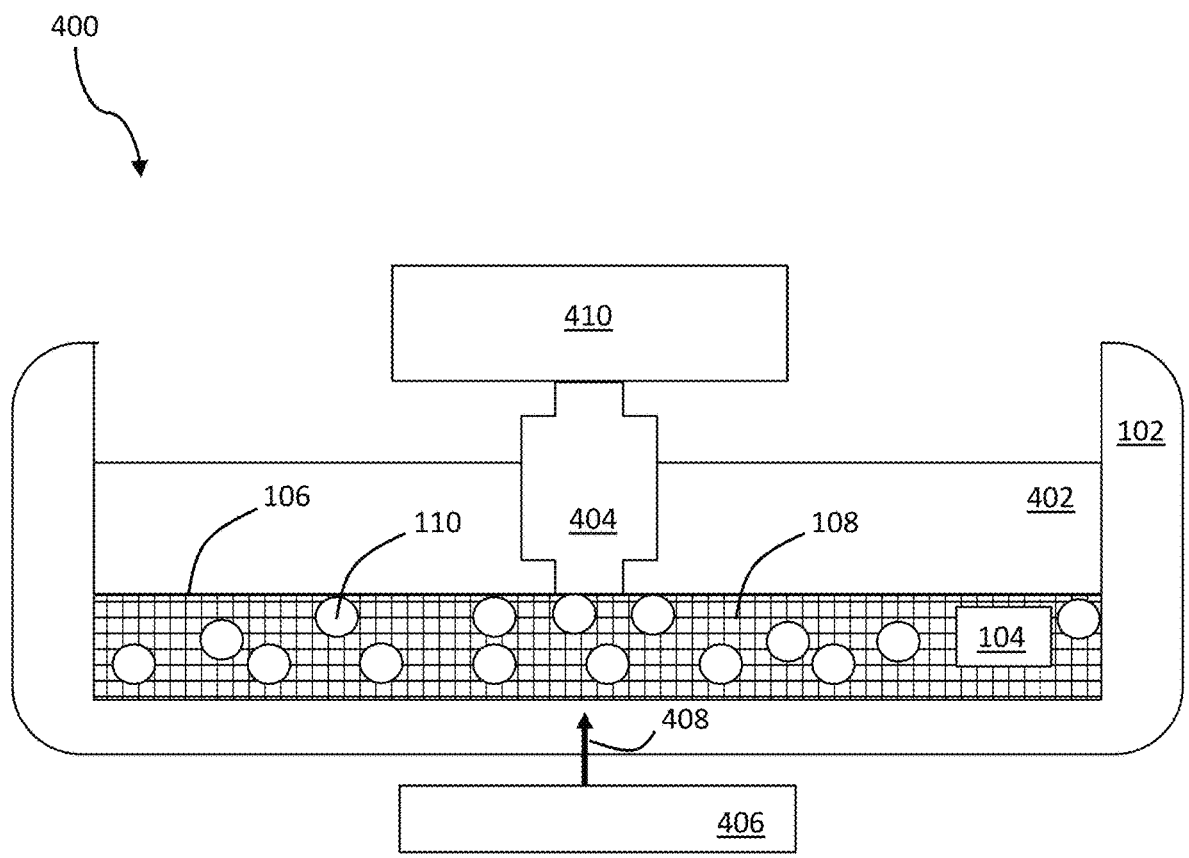
FIG. 4 shows, according to some embodiments, a cross-sectional diagram of an additive manufacturing device comprising a print surface, wherein a three-dimensional object is formed on a build platform such that the three-dimensional object is in contact with the print surface.

Methods of additive manufacturing utilizing the print surface are also described. In certain embodiments, for example, a method of additive manufacturing comprises forming a three-dimensional object from a resin (e.g., a photopolymer resin). In some embodiments, the three-dimensional object is formed such that the three-dimensional object is in contact with the print surface as described herein. For example, FIG. 4 shows a cross-sectional diagram of additive manufacturing device 400 comprising print surface 104, wherein resin 402 is disposed over print surface 104 and three-dimensional object 404 is formed on build platform 410 from resin 402 such that three-dimensional object 404 is in contact with print surface 104. In some such embodiments, print surface 104 comprises interface 106 between print surface 104 and resin 402 or between print surface 104 and three-dimensional object 404. Interface 106 may comprise a layer of second component 110 (e.g., liquid), first component 108 (e.g., solid matrix), and/or combinations thereof.

As would generally be understood by a person of ordinary skill in the art and as described herein, additive manufacturing device 400 (e.g., a stereolithographic three-dimensional printer) may be configured to fabricate three-dimensional object 404 on print surface 104 by curing selected regions of resin 402 (e.g., a photopolymer resin) located in tank 102 disposed on print surface 104. To form a layer of three-dimensional object 404 on build platform 410, select regions of resin 402 are cured using source 406 of actinic radiation 408, such as a laser or display screen (DLP, LCD, microLED). As shown in FIG. 4, source 406 of actinic radiation 408 may be positioned below print surface 104 and tank 102, in certain embodiments. In some such embodiments and as described herein, print surface 104 and/or tank 102 may be at least partially transparent to allow actinic radiation 408 to pass through print surface 104 and tank 102. Three-dimensional object 404 may be formed layer-by-layer on build platform 410 such that three-dimensional object is in contact with print surface 104, in some embodiments. Although not shown in FIG. 4, the additive manufacturing device may further comprise one or more moveable stages in order to move build platform 410 and/or source 406 of actinic radiation 408.

Any of a variety of suitable additive manufacturing techniques may be utilized. In certain embodiments, for example, additive manufacturing comprises stereolithography. Other additive manufacturing techniques include selective or fused deposition modeling, direct composite manufacturing, laminated object manufacturing, selective phase area deposition, multi-phase jet solidification, ballistic particle manufacturing, particle deposition, laser sintering, and/or combinations thereof.

In some embodiments, print surface 104 and/or components thereof (e.g., first component 108, second component 110) are inert with respect to a resin (and/or a three-dimensional object formed from the resin). For example, referring to FIG. 4, print surface 104 (e.g., first component 108 and second component 110) is inert with respect to resin 402 and/or three-dimensional object 404 formed from resin 402.

According to certain embodiments, second component 110 (e.g., the fluid) and the resin (and/or a three-dimensional object resulting from the resin) are immiscible. Referring, for example, to FIG. 4, second component 110 and resin 402 and/or three-dimensional object 404 are immiscible.

According to some embodiments, the three-dimensional object in contact with the print surface may have a relatively low adhesion to the print surface. In certain embodiments, for example, removing a three-dimensional object in contact with the print surface may require a relatively low peel force (e.g., relative to conventional additive manufacturing devices comprising solid growth substrates). As used herein, the term "peel force" is given its ordinary meaning in the art and generally refers to the amount of force necessary to overcome the adhesive forces and initiate a peel of an object (e.g., a manufactured three-dimensional object) away from the surface of the print surface. As would generally be understood by a person of ordinary skill in the art, the value of the peel force may depend on a variety of factors, including, but not limited to, the geometry of the object being printed, area of the object being printed, resin type, etc.

In certain embodiments, the relatively low peel force may be attributed to at least a portion of three-dimensional object 404 being in contact with at least a portion of second component 110 (e.g., fluid) of print surface 104. According to some embodiments, for example, removing three-dimensional object 404 from print surface 104 requires a first peel force that is less than a second peel force required to remove the three-dimensional object from a print surface that does not comprise second component 110 but is otherwise equivalent.

In some embodiments, print surface 104 is displaceable with respect to tank 102. For example, in some embodiments, during the fabrication of a layer of three-dimensional object 404, print surface 104 is controlled to move relative to the bottom surface of tank 102 (e.g., moving on an XY plane) such that the vertical distance between print surface 104 and build platform 410 remains substantially constant. In some such embodiments, print surface 104 may be driven by one or more motors to move or rotate horizontally with respect to tank 102 as a layer of three-dimensional object 404 is being formed, or shortly after a layer of three-dimensional object 404 is formed.

The following examples are intended to illustrate certain embodiments of the present invention, but do not exemplify the full scope of the invention.

EXAMPLE 1

The following example describes a print surface comprising sintered powders combined with fluorinated fluids.

Sintered powder substrates were prepared from both FEP and PFA powders. Sintering was performed by heating each of the packed powder distributions in a mold to a controlled temperature. The temperature was held for a fixed time and the sample was slowly cooled to room temperature. The sintered powder matrix materials were then removed from the mold and saturated with fluorinated liquids, thereby forming print surfaces suitable for SLA printing.

EXAMPLE 2

The following example describes print surfaces comprising PDMS combined with a fluorinated fluid.

A first print surface was fabricated by adding a low viscosity fluorinated fluid to PDMS foam. The PDMS foam adsorbed the fluorinated fluid.

A second set of print surfaces were fabricated by mixing PDMS gel with a fluorinated fluid in a 2:1 molar ratio with a catalyst. Separate samples were mixed for 1 minute at 1500 rpm, 1 minute at 2000 rpm, and 1 minute at 2500 rpm, each resulting in an emulsion of the fluorinated fluid in the PDMS gel. The emulsions were cured, thereby providing the print surfaces.

Resins were provided onto the above described print surfaces and cured. The resulting three-dimensional objects were unadhered to the print surfaces.

EXAMPLE 3

The following example describes print surfaces comprising PTFE combined with a fluorinated fluid.

A first print surface was fabricated by adding a low viscosity fluorinated fluid to an expanded PTFE matrix. The expanded PTFE matrix was wetted and adsorbed the fluorinated fluid.

A second print surface was fabricated by disposing an expanded PTFE matrix over a reservoir of the fluorinated fluid such that the expanded PTFE matrix was in fluid communication with the rservori. The fluorinated fluid was supplied from the reservoir to the expanded PTFE matrix, filling the expanded PTFE matrix to capacity. The expanded PTFE matrix was wetted and absorbed the fluorinated fluid, thereby becoming transparent.

Resins were provided onto the above described print surfaces and cured. The resulting three-dimensional objects were unadhered to the print surfaces.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive manufacturing device, comprising:
   a print surface configured to contact a three-dimensional object formed by additive manufacturing, the print surface comprising:
      a first component comprising a solid matrix comprising a plurality of voids, wherein the solid matrix has a void fraction greater than or equal to 30%; and
      a second component comprising a fluorinated liquid, wherein the second component comprising the fluorinated liquid is at least partially disposed within one or more voids of the plurality of voids of the solid matrix, and wherein the second component at least partially forms a film over the first component.

2. The additive manufacturing device of claim 1, wherein the first component and the second component are miscible.

3. The additive manufacturing device of claim 1, wherein the first component and the second component are immiscible.

4. The additive manufacturing device of claim 1, wherein the solid matrix comprises a polymer and/or a glass.

5. The additive manufacturing device of claim 1, wherein the solid matrix comprises a gel, an aerogel, fibers, a foam, an elastomer, a silicate, and/or a sintered powder.

6. The additive manufacturing device of claim 1, wherein the solid matrix comprises polydimethylsiloxane (PDMS), polytetrafluoroethylene (PTFE), polymethylpentene (PMP), fluorinated ethylene propylene (FEP), ethylene tetrafluoroethylene (ETFE), a perfluoroalkoxy alkane (PFA), a fluorosilicone, a fluorocarbon elastomer, and/or silicon dioxide.

7. The additive manufacturing device of claim 1, wherein the fluorinated liquid comprises hexafluoropropylene oxide and/or a (per)fluorinated alkyl amine.

8. The additive manufacturing device of claim 1, wherein the additive manufacturing device further comprises a reservoir of the fluorinated liquid.

9. The additive manufacturing device of claim 8, wherein the print surface is disposed proximate to the reservoir.

10. The additive manufacturing device of claim 8, wherein the print surface is disposed over the reservoir.

11. The additive manufacturing device of claim 1, comprising the first component in an amount between greater than or equal to 1% by weight and less than or equal to 90% by weight versus the total weight of the print surface and the second component in an amount between greater than or equal to 10% by weight and less than or equal to 99% by weight versus the total weight of the print surface.

12. The additive manufacturing device of claim 1, wherein the second component is at least partially absorbed by the first component.

13. The additive manufacturing device of claim 1, wherein the print surface is disposed over a support layer.

14. The additive manufacturing device of claim 13, wherein a reservoir of fluorinated liquid is disposed over the support layer.

15. The additive manufacturing device of claim 13, wherein the support layer is transparent.

* * * * *